Feb. 17, 1970  B. B. LAVIN ET AL  3,495,717
FOOD DISPLAY EQUIPMENT
Filed May 6, 1968  3 Sheets-Sheet 1
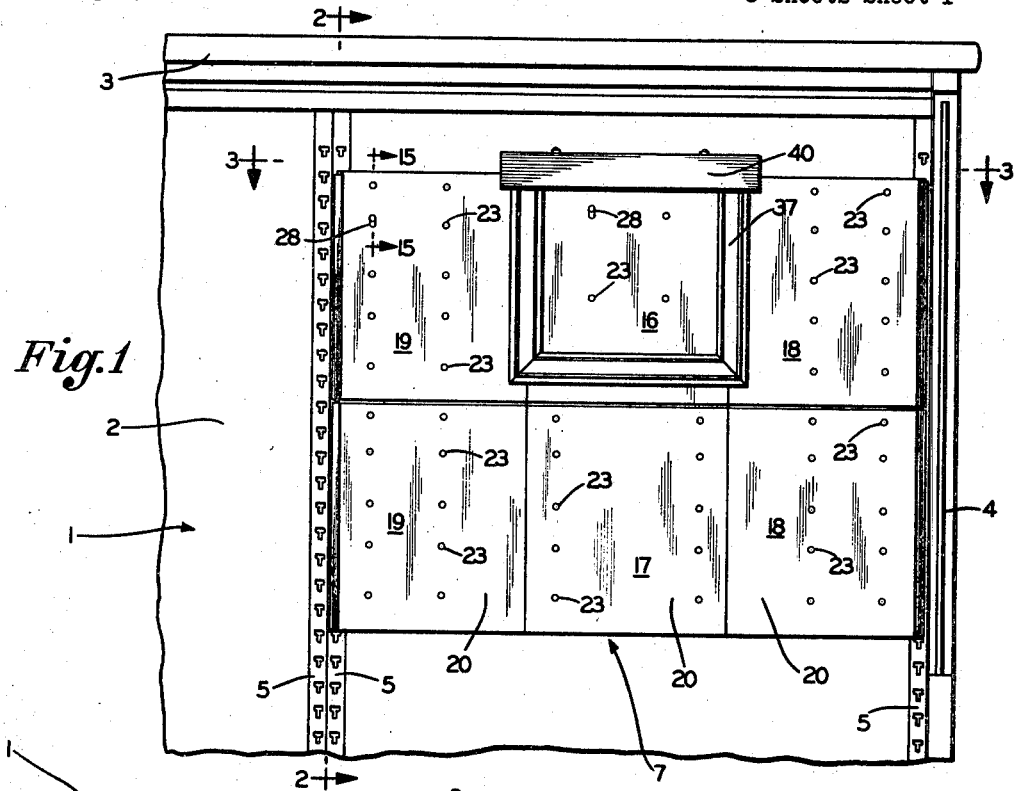
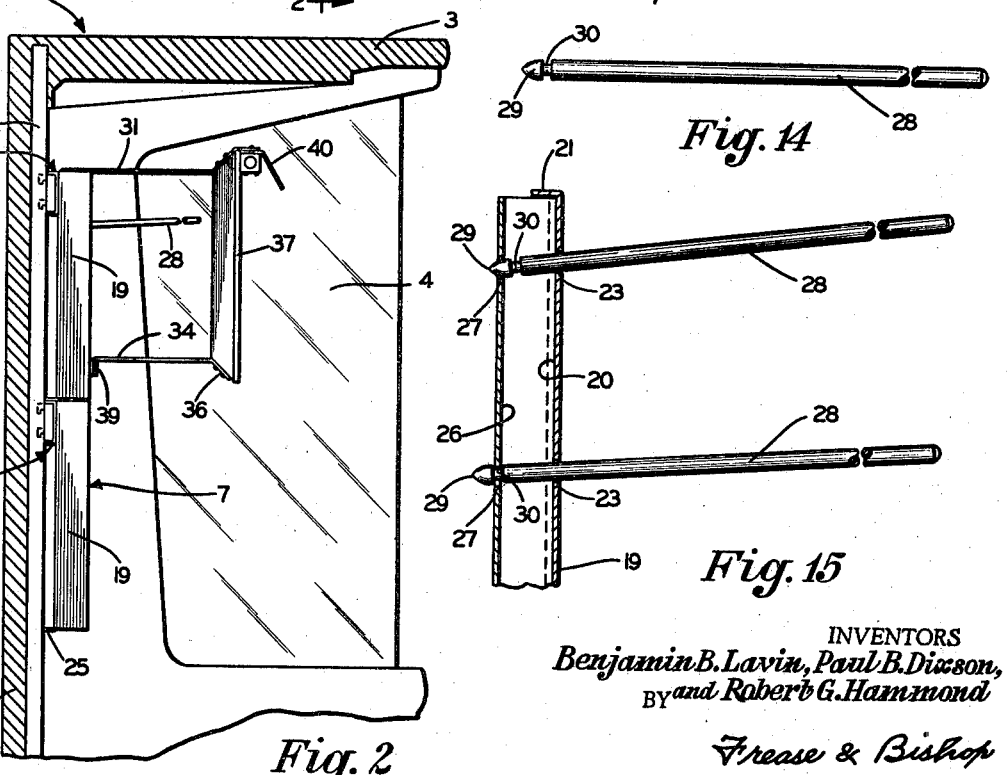
INVENTORS
Benjamin B. Lavin, Paul B. Dixson,
BY and Robert G. Hammond
Frease & Bishop
ATTORNEYS

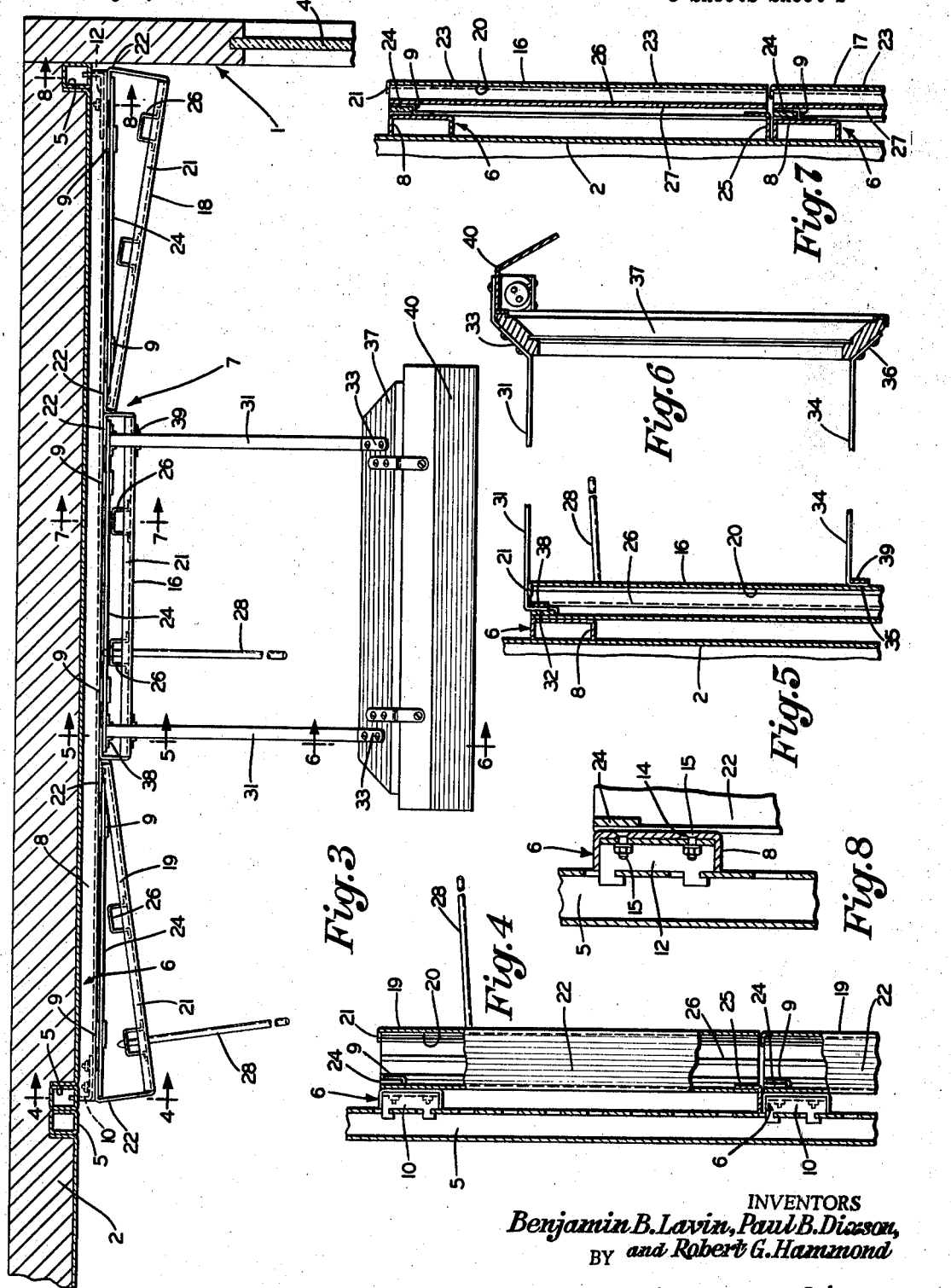

INVENTORS
Benjamin B. Lavin, Paul B. Dixson,
and Robert G. Hammond
BY Frease & Bishop
ATTORNEYS

United States Patent Office 3,495,717
Patented Feb. 17, 1970

3,495,717
FOOD DISPLAY EQUIPMENT
Benjamin B. Lavin and Paul B. Dixson, Canton, Ohio, and Robert G. Hammond, New York, N.Y., assignors to Sugardale Foods, Inc., Canton, Ohio, a corporation of Ohio
Filed May 6, 1968, Ser. No. 726,820
Int. Cl. A47f 7/00
U.S. Cl. 211—59                                                                         10 Claims

ABSTRACT OF THE DISCLOSURE

A paneled peg board device for displaying foods, particularly meat products in packaged form, in refrigerated meat cases. The paneled device uses offset and angled frames, different colors, lighting fixtures and concealed compartments to permit changing the location and arrangement of pegs, to provide for specially arranged displays, to induce and hold customers attention, and to enable mounting of the device on standard refrigerated meat cases of various makes.

BACKGROUND OF THE INVENTION

Field of the invention

The invention relates to equipment for supporting and displaying meat products in packaged form in the meat departments of retail stores and supermarkets. Such products normally are supported and displayed on pegs mounted on peg boards located or supported on refrigerated meat cases. Usually the pegs are arranged in regular horizontal and vertical rows on peg boards. Such peg boards when mounted on standard meat cases of various makes present to the customer a drab uniform, regular or military impression with repeated, regularly-arranged series of packages of meat products hanging from the pegs. The usual mounting of a usual peg board on a standard refrigerated meat case prevents changing of the location of the pegs without detaching the peg board from the meat case, which means removing possibly two hundred pounds of packaged meat supported on one board to remove the board to change peg location and display arrangement.

Description of the prior art

Usual refrigerated meat cases of various makes have upright back-boards and canopy-like lighting fixtures at the tops of the back-boards. Standard flat peg boards are mounted on the back boards with regularly-arranged pegs on which packaged meat products hang. Usually the regularly-arranged pegs with packaged meat products hanging therefrom present a drab, in-line, military-like appearance. The display does not specially attract the attention of customers and there is no convenient way of displaying special promotions or sales values. The peg board mounting is such that peg arrangement cannot be changed without dismantling the board and the meat products hung thereon.

SUMMARY OF THE INVENTION

Objectives of the invention include providing a display device for packaged meat products which has special attention-attracting elements to aid in sales promotion of specially valued or advertised items; providing an entire display unit which focuses customer attention on a particular area or zone and directs other display-zone visibility toward the center of visibility of the particular zone; providing a display device havings pegs on which the packaged meat products are suspended which pegs may be relocated in any manner whenever desired without dismounting the peg board means which support the pegs, from the meat case on which the board is mounted; providing a display device having the indicated features which may be readily mounted as a unit on a typical four foot section of any make of refrigerated meat case; providing a new sales promotion tool for packaged meat products; and providing a sales promotion packaged meat product display device avoiding difficulties and limitations heretofore encountered or imposed, achieving the stated objectives simply, effectively and inexpensively, and solving problems and satisfying existing needs.

These objectives and advantages are obtained by the peg board display construction for packaged meat products, the general nature of which may be stated as including a series of panel members forming a display unit, each panel member having a perforated front face member and mounting members spaced rearwardly of the front member forming a concealed compartment, peg engaging means located in said compartment, a series of pegs each having a mounting end and a support end, the mounting end of each peg extending through a perforation in said front member and being releasably engaged with said peg engaging means; adjustable support means releasably engageable with a unit section of a refrigerated meat case back board; the support means having clip means engageable with the panel mounting members for supporting a series of panel members on the support means, and in turn thereby on the meat case; the panel members preferably being arranged in at least two horizontal and at least three vertical rows and preferably being differently colored; a preferably illuminated framing member mounted on a center panel member in an intermediate vertical row spaced outwardly of the perforated front face of said center panel member; and the face members of panel members in vertical rows at either side of said center panel member being angled out of parallelism with the face member of said center panel member and facing toward the framing member mounted thereon so that visibility of a person viewing the framing member radiates to said angled panel members; whereby pegs mounted on the center panel display as a center of attraction meat products hung thereon framed by said illuminated framing member; and whereby packaged meat products of various sizes may be displayed in special arrangements on the angled panels in attention attracting designs around said framing member.

BRIEF DESCRIPTION OF THE DRAWING

A preferred embodiment of the invention—illustrative of the best mode in which applicants have contemplated applying the principles—is set forth in the following description and shown in the drawings and is particularly and distinctly pointed out and set forth in the appended claims.

FIGURE 1 is a front elevation of a food display unit of the present invention mounted on the back board of a refrigerated meat case;

FIG. 2 is a vertical section taken on the line 2—2, FIG. 1;

FIG. 3 is a horizontal section taken on the line 3—3, FIG. 1;

FIG. 4 is a section taken on the line 4—4, FIG. 3;
FIG. 5 is a section taken on the line 5—5, FIG. 3;
FIG. 6 is a section taken on the line 6—6, FIG. 3;
FIG. 7 is a section taken on the line 7—7, FIG. 3;
FIG. 8 is an enlarged section taken on the line 8—8, FIG. 3;

FIG. 14 is a side view of one of the pegs; and

FIG. 15 is a section on line 15—15, FIG. 1, showing the manner in which the pegs are releasably mounted.

Similar numerals refer to similar parts throughout the drawings.

DESCRIPTION OF THE PREFERRED EMBODIMENT

A portion of a typical standard refrigerated meat case is indicated at 1 having a back board 2, an illuminated top canopy 3, a side wing 4, and notched mounting bars 5 at spaced intervals. Usually the bars 5 are located at four foot intervals but this is approximate and may vary slightly from make to make of meat case.

Figure 11:
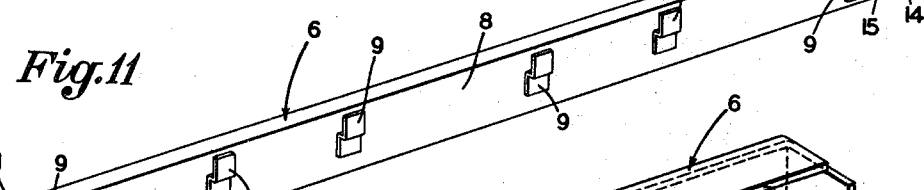
FIG. 11 is a perspective view of the adjustable support means.
Figure 12:
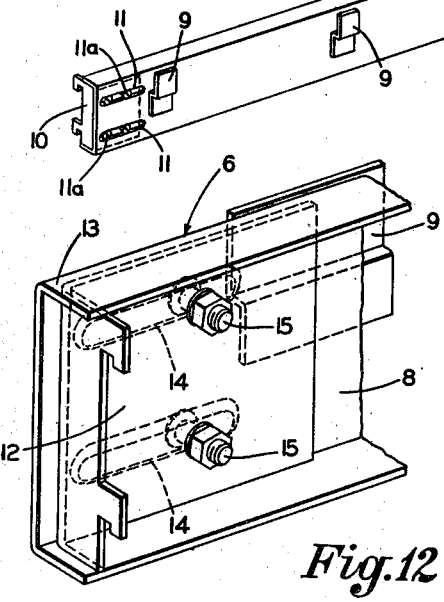
FIG. 12 is a rear perspective view of one end of the support means shown in FIG. 11.
Figure 13:
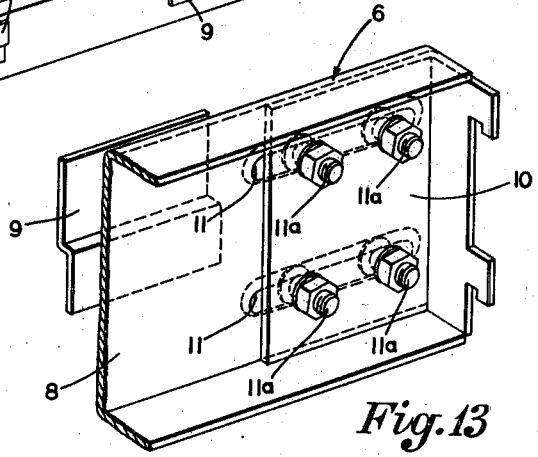
FIG. 13 is a similar view of the other end of the support means.

Several longitudinally extending adjustable support members (FIG. 11) 6 are mounted in vertically spaced relation on the mounting bars 5 for each improved display unit generally indicated at 7. Each support member 6 comprises a channel bar 8 having upturned clips 9 secured thereto. At one end an angular hook member 10 is adjustably secured to member 8 by slots 11 and bolts 11a, and a similar hook member 12 is adjustably secured to the other end 13 of member 8 by slots 14 and bolts 15. This adjustability permits the members 6 to be hooked by members 10 and 12 to the meat case notched mounting bars 5 irrespective of spacing of bars 5.

Figure 9:
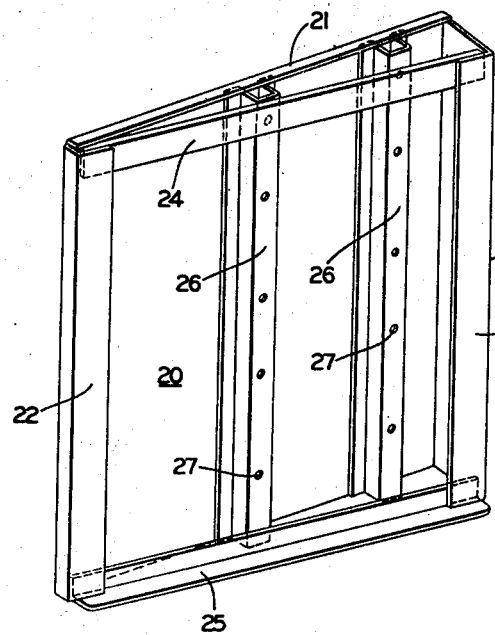
FIG. 9 is a perspective view of the rear of one of the angled panels.

Each display unit 7, as shown, comprises an upper center panel 16, a lower center panel 17, right side or wing panels 18, and left side or wing panels 19. Each panel 16, 17, 18, or 19 has a front face member 20 which may terminate in a top flange 21 and side angled flanges 22. The side flanges 22 on wing panels 18 and 19 have different depths as shown in FIGS. 3 and 9 so that the front face members 20 of panels 18 and 19 face in directions converging toward each other and the face member 20 of panels 18 and 19 also are out of parallelism with the face members 20 of panels 16 and 17 as well shown in FIG. 3.

Each member 20 is provided with a series of perforations or holes 23. Each panel 16, 17, 18, and 19 has a top mounting bar 24 connected at its ends to the side flanges 22, and bottom angles 25 also extend between and are connected to the side flanges 22 of each panel 16, 17, 18, and 19. The top mounting bars 24 are supported on clips 9 of support members 6. As shown, the side flanges 22, top bars 24 and bottom angles 25 form compartments behind the front face members 20 of each panel 16, 17, 18, and 19. Channel members 26 are located in the compartments and extend vertically behind each series of holes 23 in each panel. The channels 26 are secured as by spot welding to the rear of front face members 20. A series of holes 27 is formed in each channel member 26 (FIG. 15) spaced in the same way that the holes 23 in the front face members 20 are spaced. Holes 27 are located in each instance slightly below the level of the adjacent holes 23. Pegs 28 on which packaged meat products are supported, preferably are cylindrical rods, for example, twelve to fourteen inches long, formed by stainless steel and provided with a centering or pilot nose 29 and an adjacent groove 30. A peg 28 is mounted on any panel by inserting nose 29 through holes 23 and 27 as indicated for the upper peg 28 in FIG. 15 and then engaging groove 30 with the channel 26 around hole 27 as indicated for the lower peg 28 in FIG. 15. The misalignment of holes 23 and 27 gives an upward cant to pegs 28, as shown, to prevent packages hung from slipping off the ends of the pegs.

Figure 10:
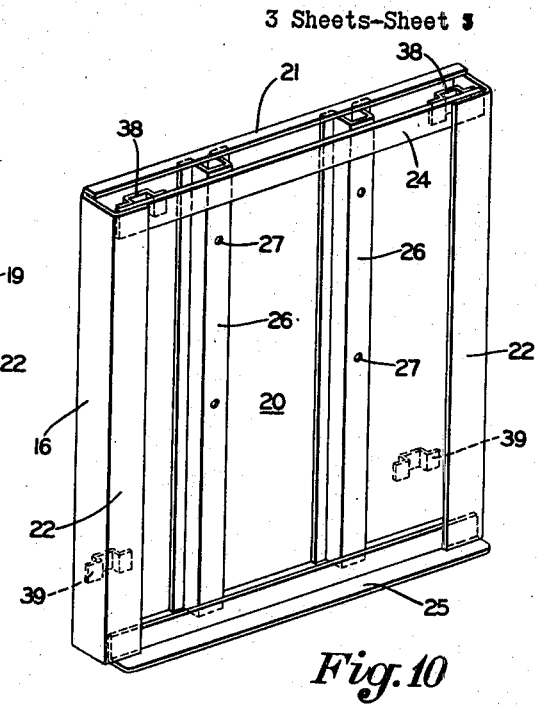
FIG. 10 is a similar view of one of the center panels.

A pair of upper angle brackets 31 having downturned ends 32 and angled ends 33, and a pair of lower angle brackets 34 having downturned ends 35 and angled ends 36 supported a frame 37 on upper center panel 16. The ends 32 are engaged in brackets 38 on top mounting bar 24 (FIG. 10), and the ends 35 of brackets 34 are engaged in brackets 39 at the lower corners of panel 16. Angled ends 33 and 36 are connected to frame 37. A light fixture 40 may be mounted on the top of frame 37. The panels 16, 17, 18, and 19 may be painted in different colors.

Pegs 28 may be mounted or removed with ease in any of a pair of holes 23–27 so that any desired arrangement of packaged meats in diverse sized packages may be hung on pegs on the display unit 7. Featured items as advertised or the basis of sales promotions may be hung on pegs visible through frame 37 which may define a "value center." This special area is lighted to attract attention. The beveled or non-parallel arrangement of side panels 18 and 19 direct visibility thereof toward the point of customer visibility of the frame 37.

Thus, the improved construction is adapted to be mounted on the back board of any usual meat case and focuses or centers special attention to its "value center"; the changeable peg locations break up the drab in-line effect of prior structures; the new structure permits peg location change without removal of the panels; the improved multiple panel arrangement with angularly arranged faces generally attracts attention to all its components and the packages supported thereon; the attraction of attention and break up of drabness is enhanced by the multicolored panels; and the new construction thus provides a simple, effective, sturdy and unusual display device for packaged products of any kind and especially meat products, which eliminates difficulties heretofore encountered with prior display devices, achieves the objectives and solves existing problems in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved display device is constructed and used, the characteristics of the new construction, and the advantageous, new and useful results obtained; the new and useful structures, devices, elements, arrangements, parts and combinations, and mehcanical equivalents obvious to those skilled in the art are set forth in the appended claims.

We claim:

1. In the construction of a peg board display device adapted to be mounted on the back board of a refrigerated meat case and the like, a plurality of center and side panel members having front face members disposed in angular non-parallel arrangement, there being at least two horizontal and at least three vertical rows of panel members, each panel member having a mounting member spaced rearwardly of the front face member; a series of peg-receiving holes formed in each front face member; peg-engaging means mounted on each panel spaced rearwardly of the front face member; package support pegs releasably engaged and supported in said holes and by said engaging means at spaced locations lengthwise of said pegs; support means having adjustable hook means adapted to be releasably mounted on the back board of a meat case; and means releasably mounting said panel mounting members on said support means.

2. The construction defined in claim 1 in which a frame member is mounted on a center panel in one of the horizontal rows of panels, and in which the frame member is spaced outwardly of the front face member of said panel.

3. The construction defined in claim 2 in which lighting means is mounted on said frame member.

4. The construction defined in claim 1 in which the front face member of a center panel member in one of the horizontal rows is parallel with the rearwardly spaced mounting member of said panel; in which two side panel members are located in said horizontal row, one at either side of said center panel member; and in which the front face members of said side panel members each extend in a plane forming an acute angle with the plane in which the rearwardly spaced mounting member of such side panel member extends.

5. The construction defined in claim 1 in which each package support peg comprises a straight rod member having a mounting end and a support end; in which each peg has groove means formed therein adjacent its mounting end; in which the peg-engaging means is formed with a series of holes similar to but spaced rearwardly of the front face member peg-receiving holes, thereby providing a pair of spaced holes adapted to receive each peg; and in which each peg is engaged with and mounted on said panel by passing the peg mounting end through the panel front face hole and engaging the peg groove means in the adjacent peg-engaging means hole of a pair.

6. The construction defined in claim 5 in which the peg-engaging means comprise vertical channels mounted on the front face member of each panel with the series of holes formed therein misaligned with the series of peg-receiving holes formed in the panel front face member.

7. The construction defined in claim 1 in which the support means comprises a member formed with clips adapted to be engaged by and to support the panel mounting members of a plurality of panels; and in which the adjustable hook means on the support means comprise a hook member mounted at either end of the support means with one hook member being adjustable longitudinally of the support means to adapt said support means for mounting on meat case back boards having variations in the spacing of meat case bar means engaged by said hook members.

8. The construction defined in claim 1 in which a pair of upper and a pair of lower angle brackets are mounted on a center panel respectively adjacent upper and lower panel edges, in which the angle brackets project from the front face of said panel member, and in which a frame member is mounted on said angle brackets spaced outwardly of front face of said center panel.

9. The construction defined in claim 1 in which there are horizontal upper and lower rows of panels; and in which there are a center and two side panels in each horizontal row.

10. The construction defined in claim 9 in which a frame member is mounted on the center panel of the upper horizontal row of panels spaced outwardly of the front face member of such center panel.

References Cited

UNITED STATES PATENTS

| | | | |
|---|---|---|---|
| 2,940,606 | 6/1960 | Kurnitz | 211—183 |
| 3,139,985 | 7/1964 | Sinclair | 211—176 XR |
| 3,229,819 | 1/1966 | Berk | 211—59 |
| 3,269,552 | 8/1966 | Townsend | 211—103 |

DAVID J. WILLIAMOWSKY, Primary Examiner

ANDREW V. KUNDRAT, Assistant Examiner

U.S. Cl. X.R.

211—176; 312—117, 223